United States Patent
Ohtaki et al.

(10) Patent No.: US 7,156,772 B2
(45) Date of Patent: Jan. 2, 2007

(54) NON-CONTACT TYPE ENGINE START SWITCH DEVICE

(75) Inventors: Kiyokazu Ohtaki, Aichi (JP); Yukio Iwasaki, Aichi (JP); Tomoyuki Funayama, Toyota (JP); Koji Iwamoto, Aichi-ken (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 125 days.

(21) Appl. No.: 10/829,891

(22) Filed: Apr. 22, 2004

(65) Prior Publication Data

US 2004/0212252 A1    Oct. 28, 2004

(30) Foreign Application Priority Data

Apr. 25, 2003  (JP) .............................. 2003-121853

(51) Int. Cl.
*F16H 59/74* (2006.01)
*F02N 17/00* (2006.01)

(52) U.S. Cl. ................. 477/99; 123/179.4; 123/179.24

(58) Field of Classification Search ................. 477/99; 355/205, 207; 123/618, 179.1–179.4, 179.24, 123/179.28
See application file for complete search history.

(56) References Cited

U.S. PATENT DOCUMENTS

| | | | |
|---|---|---|---|
| 6,500,092 B1* | 12/2002 | Syamoto | 477/99 |
| 6,584,957 B1* | 7/2003 | Iwata et al. | 123/406.57 |
| 6,661,114 B1* | 12/2003 | Syamoto | 307/10.1 |
| 6,814,056 B1* | 11/2004 | Suzuki | 123/406.57 |
| 6,948,469 B1* | 9/2005 | Harada et al. | 123/179.4 |
| 2002/0196113 A1* | 12/2002 | Rudd et al. | 335/205 |
| 2003/0117295 A1* | 6/2003 | Okada | 340/825.72 |
| 2004/0155525 A1* | 8/2004 | Ohtaki et al. | 307/10.5 |
| 2004/0207516 A1* | 10/2004 | Ohtaki et al. | 340/438 |
| 2004/0226529 A1* | 11/2004 | Nantz et al. | 123/179.2 |
| 2004/0262068 A1* | 12/2004 | Matsubara et al. | 180/287 |

FOREIGN PATENT DOCUMENTS

| | | |
|---|---|---|
| DE | 19821899 | 12/1999 |
| DE | 19909064 | 9/2000 |
| EP | 1067260 | 1/2001 |
| FR | 2569076 A * | 2/1986 |
| JP | 2001-289142 | 10/2001 |

* cited by examiner

*Primary Examiner*—Tisha Lewis
(74) *Attorney, Agent, or Firm*—Patterson, Thuente, Skaar & Christensen, P.A.

(57) ABSTRACT

A switch device that improves reliability in starting an engine is provided. The switch device includes a push button, a magnetic sensor, and a power supply ECU. The push button is pressed by a driver to start the engine. The magnetic sensor detects that the push button has been pressed, in a non-contact manner. The power supply ECU is connected to the magnetic sensor and supplies power to the magnetic sensor to enable the magnetic sensor to detect that the push button has been pressed.

18 Claims, 1 Drawing Sheet

NON-CONTACT TYPE ENGINE START SWITCH DEVICE

BACKGROUND OF THE INVENTION

The present invention relates to a switch device, and more particularly, to a non-contact type engine start switch device.

In recent years, engine start systems having a "smart ignition" function have been used in automobiles to improve their security level and convenience. As one example, Japanese Laid-Open Patent Publication No. 2001-289142 discloses a control device for use in a vehicle having a smart ignition function. The control device communicates with a portable device held by a driver. The smart ignition function permits an engine of a vehicle to be started just by bringing the portable device into the vehicle. The engine, which is then permitted to start by the security system, can be started by operating an engine start switch.

The driver of the vehicle with the smart ignition function is not required to perform a complicated key operation to start the engine. The driver can start the engine simply by bringing the portable device in the vehicle and operating the engine start switch. In this way, the smart ignition function provides improved convenience. Further, the engine is not permitted to start unless the driver holds the portable device, which is far more difficult to copy than a conventional mechanical key. The smart ignition function also provides improved security.

A contact type switch is presently used as the engine start switch. When the engine start switch is operated, for example, in a low-temperature environment, starting of the engine may be delayed by chattering, which uniquely occurs in a contact type switch. This disadvantageous feature of contact type switches have made it difficult to render the engine start switch to have high reliability in starting the engine.

SUMMARY OF THE INVENTION

The present invention provides a switch device that improves reliability in starting an engine.

The present invention provides a switch device for starting an engine of a vehicle by a driver. The switch device includes an operated member operable by the driver for starting the engine. A detection unit is supplied with power for detecting, in a non-contact manner, that the operated member has been operated. A power supply control unit, connected to the detection unit, controls power to the detection unit to enable the detection unit to detect that the operated member has been operated.

A further aspect of the present invention is a switch device for starting an engine of a vehicle by a driver using a portable device that transmits a signal including an ID code. The vehicle has an ID code and a brake. The switch device includes a comparison unit for receiving the signal including the ID code from the portable device, comparing the ID code of the portable device with the ID code of the vehicle, generating a permission signal when the two ID codes match, and outputting the permission signal. An operated member is operable by the driver for starting the engine. A detection unit is supplied with power for detecting, in a non-contact manner, that the operated member has been operated. A brake sensor detects a brake operation performed by the driver. A power supply control unit, connected to the comparison unit, the detection unit, and the brake sensor, receives the permission signal from the comparison unit and controls power to the detection unit. The power supply control unit supplies power to the detection unit in response to the permission signal and continuously supplies power to the detection unit either in a period during which the brake sensor is detecting the brake operation or in a period until a predetermined time elapses from when the brake sensor detects the brake operation.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
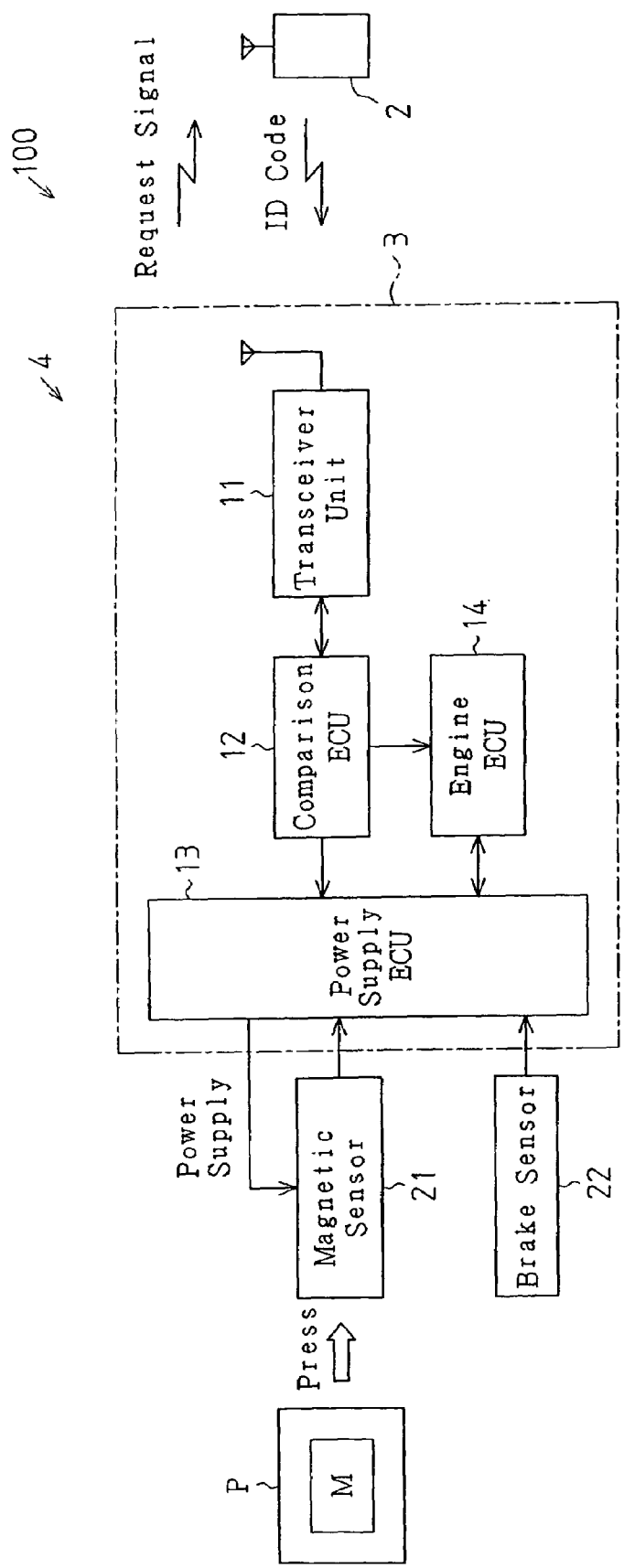
FIG. 1 is a schematic block diagram showing the structure of an engine start system that includes a switch device according to a preferred embodiment of the present invention.

The following describes a switch device 4 according to a preferred embodiment of the present invention.

As shown in FIG. 1, an engine start system 100 includes a portable device 2 and the switch device 4. The portable device 2 is held by a driver. The switch device 4 is mounted on an automobile. In the engine start system 100, the portable device 2 transmits an ID signal and the switch device 4 transmits a request signal to establish mutual communication between the portable device 2 and the switch device 4.

The portable device 2 has a communication function. The portable device 2 receives a request signal from the switch device 4 and transmits a signal including an ID code unique to the portable device 2 (an ID code that differs depending on each portable device) as a radio wave with a predetermined frequency (300 MHz in the preferred embodiment) in response to the request signal.

The switch device 4 includes an engine start controller 3, a magnetic sensor (detection unit) 21, a brake sensor 22, and a push button P, which functions as a pressed member or an operated member. The engine start controller 3 includes a transceiver unit 11, a comparison ECU (comparison unit) 12, a power supply ECU (power supply control unit) 13, and an engine ECU 14. The transceiver unit 11 receives a request signal from the comparison ECU 12, and transmits the request signal as a radio wave with a predetermined frequency (134 KHz in the preferred embodiment). The transceiver unit 11 receives a signal including an ID code from the portable device 2. The transceiver unit 11 demodulates the signal from the portable device 2 to generate a reception signal, and provides the comparison ECU 12 with the reception signal.

The comparison ECU 12 includes, for example, a CPU, a ROM, and a RAM (not shown). The comparison ECU 12 stores an ID code (ID code of the automobile) identical to the ID code of the portable device 2. The comparison ECU 12 provides the transceiver unit 11 with a request signal to establish mutual communication with the portable device 2. Upon receipt of the reception signal including the ID code from the transceiver unit 11, the comparison ECU 12 compares the ID code of the portable device 2 with the ID code of the automobile, and determines whether the two ID codes match (ID code comparison). When the two ID codes match, the comparison ECU 12 provides the power supply ECU 13 and the engine ECU 14 with an engine start permission signal (engine start permission control).

The magnetic sensor 21 and the brake sensor 22 are electrically connected to the power supply ECU 13. The push button P includes a magnet M and is arranged in the vicinity of the magnetic sensor 21. The power supply ECU 13 supplies power to the magnetic sensor 21 and the brake sensor 22. When supplied with power by the power supply ECU 13, the magnetic sensor 21 is enabled to detect pressing of the push button P by the driver. In more detail, the push button P is pressed when the magnetic sensor 21 is being supplied with power by the power supply ECU 13. As the push button P is pressed, the magnet M approaches the magnetic sensor 21. The magnetic sensor 21 detects a magnetic force of the magnet M and detects the pressing of the push button P. The magnetic sensor 21 provides the power supply ECU 13 with a detection signal corresponding to the pressing of the push button P.

The brake sensor 22 detects a brake operation performed by the driver. To be more specific, the brake sensor 22 detects that the driver has operated (depressed) a brake pedal (not shown). The brake sensor 22 then provides the power supply ECU 13 with a detection signal corresponding to the brake operation.

The power supply ECU 13 does not supply power to the magnetic sensor 21 when not provided with an engine start permission signal by the comparison ECU 12. Even if the push button P is pressed by the driver when the power supply ECU 13 is not provided with an engine start permission signal, the magnetic sensor 21 does not detect the pressing of the push button P. The power supply ECU 13 maintains the functional position at the ignition OFF position when not provided with an engine start permission signal by the comparison ECU 12. At the ignition OFF position, power is supplied to none of the accessories, such as a car stereo, electric components, such as a car air-conditioner, and a starter motor for starting an engine.

The power supply ECU 13 intermittently supplies power to the magnetic sensor 21 in a first period from when an engine start permission signal is provided from the comparison ECU 12 to when the brake operation is detected by the brake sensor 22. To be more specific, an ON period during which power is being supplied to the magnetic sensor 21 is 10 msec, and an OFF period during which power is not being supplied to the magnetic sensor 21 is 90 msec. The power supply ECU 13 repeats a cycle, which is composed of the ON period and the OFF period, throughout the first period, to intermittently supply power to the magnetic sensor 21. When the push button P is pressed by the driver in the first period, the magnetic sensor 21 detects the pressing of the bush button P.

The driver may press the push button P without performing the brake operation when the engine is being permitted to start and the functional position is at the ignition OFF position. The magnetic sensor 21 then detects the pressing of the push button P and provides the power supply ECU 13 with a detection signal. The power supply ECU 13 switches the functional position from the ignition OFF position to the ACC position in response to the detection signal provided from the magnetic sensor 21. At the ACC position, power is supplied to accessories such as a car stereo.

The driver may press the push button P without performing the brake operation when the engine is being permitted to start and the functional position is at the ACC position. The magnetic sensor 21 then detects the pressing of the push button P, and provides the power supply ECU 13 with a detection signal. The power supply ECU 13 switches the functional position from the ACC position to the ignition ON position in response to the detection signal provided from the magnetic sensor 21. At the ignition ON position, power is supplied to electric components such as a car air-conditioner, as well as to accessories such as a car stereo.

When the brake operation is detected by the brake sensor 22 while the power supply ECU 13 is being provided with an engine start permission signal by the comparison ECU 12, the power supply ECU 13 continuously supplies power to the magnetic sensor 21. To be more specific, the power supply ECU 13 continuously supplies power to the magnetic sensor 21 during a second period, in which a predetermined time (one minute in the preferred embodiment) elapses from when the brake operation is detected. When the push button P is pressed by the driver in the second period, the magnetic sensor 21 detects the pressing of the push button P.

The driver may press the push button P while performing the brake operation and while the engine is being permitted to start and the functional position is at the ignition OFF position. The magnetic sensor 21 then detects the pressing of the push button P and provides the power supply ECU 13 with a detection signal. At the same time, the brake sensor 22 detects the brake operation and provides the power supply ECU 13 with a detection signal. The power supply ECU 13 switches the functional position from the ignition OFF position to the START position in response to the detection signal provided from the magnetic sensor 21 and the detection signal provided from the brake sensor 22. At the START position, power is supplied to the starter motor for starting the engine, as well as to electric components such as a car air-conditioner.

The driver may press the push button P when performing the brake operation while the engine is being permitted to start and the functional position is at the ACC position. The magnetic sensor 21 then detects the pressing of the push button P. The power supply ECU 13 switches the functional position from the ACC position to the START position in response to a detection signal provided from the magnetic sensor 21 and a detection signal provided from the brake sensor 22.

The driver presses the push button P when performing the brake operation while the engine is being permitted to start and the functional position is at the ignition ON position. The magnetic sensor 21 then detects the pressing of the push button P. The power supply ECU 13 switches the functional position from the ignition ON position to the START position in response to a detection signal provided from the magnetic sensor 21 and a detection signal provided from the brake sensor 22.

The power supply ECU 13 provides the engine ECU 14 with an engine start command signal when switching the functional position to the START position. Upon receipt of the engine start permission signal from the comparison ECU 12 and the engine start command signal from the power supply ECU 13, the engine ECU 14 executes control necessary for starting the engine, such as fuel injection control and ignition control. This actuates the starter motor and starts the engine. The engine ECU 14 detects the starting of the engine, and provides the power supply ECU 13 with a signal indicating complete combustion in the engine. The power supply ECU 13 receives the complete combustion signal from the engine ECU 14, and switches the functional position from the START position to the ignition ON position.

The switch device 4 according to the preferred embodiment of the present invention has the following advantages.

(1) The magnetic sensor 21 is enabled to detect pressing of the push button P when supplied with power by the power supply ECU 13. When the push button P is pressed by the driver while the magnetic sensor 21 is being supplied with power, the magnetic sensor 21 detects the pressing of the push button P. In this way, one of the conditions necessary for starting the engine is satisfied. The push button P and the magnetic sensor 21 form a non-contact type switch. Thus, the switch device 4 does not have a problem with delayed starting of the engine, which is caused by chattering that uniquely occurs in a contact type switch. Further, compared with a structure using a contact type switch, the switch device 4 has drastically improved durability. Thus, the switch device 4 improves reliability in starting the engine.

(2) The power supply ECU 13 does not supply power to the magnetic sensor 21 when the engine is not permitted to start. This is because the switch device 4 does not need to monitor whether the push button P is pressed by the driver when the engine is not permitted to start. Compared with a structure that constantly supplies power to the magnetic sensor 21, the switch device 4 has reduced dark current, and prevents power consumption from being increased by dark current.

(3) The power supply ECU 13 intermittently supplies power to the magnetic sensor 21 in the first period from when the engine is permitted to start to when the brake operation is detected by the brake sensor 22. Compared with a structure for continuously supplying power to the magnetic sensor 21 in the first period, the switch device 4 has reduced dark current, and prevents power consumption from being increased by dark current.

(4) To start the engine, the driver performs the brake operation while the engine is being permitted to start. The driver then presses the push button P to start the engine. The switch device 4 employs a power supply method suitable for monitoring such pressing of the button P. To be more specific, the power supply ECU 13 continuously supplies power to the magnetic sensor 21 when the brake operation is detected while the engine is being permitted to start. According to this structure, the switch device 4 stands ready to immediately detect the pressing of the push button P by the driver. This enables the engine to start substantially in synchronization with the pressing of the push button P. In this way, responsiveness to the pressing of the push button P is improved.

(5) The power supply ECU 13 continuously supplies power to the magnetic sensor 21 only during the second period, in which a predetermined time (one minute in the preferred embodiment) elapses from when the brake operation is detected, that is, the period during which the push button P is most likely to be operated by the driver. Compared with a structure for continuously supplying power to the magnetic sensor 21 from when the brake operation is detected without such a time limit, the switch device 4 has reduced dark current, and prevents power consumption from being increased by dark current.

(6) The push button P is used not only to start the engine, but also to switch the functional position to the ACC position or to the ignition ON position. In the first period from when the engine is permitted to start to when the brake operation is detected by the brake sensor 22, the power supply ECU 13 intermittently supplies power to the magnetic sensor 21. This enables the driver to switch the functional position to the ACC position or to the ignition ON position in the first period. Thus, the switch device 4 is also effective in such a case where the driver in the vehicle only wishes to use the car stereo.

(7) The power supply ECU 13 continuously supplies power to the magnetic sensor 21 during the second period, in which a predetermined time (one minute in the preferred embodiment) elapses from when the brake operation is detected while the engine is being permitted to start. The driver may press the push button P to switch the functional position to the ACC position or to the ignition ON position after the brake operation is released. Even when the brake operation has been released, the driver obtains preferable responsiveness to the pressing of the push button P within this period of one minute.

It should be apparent to those skilled in the art that the present invention may be embodied in many other specific forms without departing from the spirit or scope of the invention. Particularly, it should be understood that the present invention may be embodied in the following forms.

In the preferred embodiment, the power supply ECU 13 continuously supplies power to the magnetic sensor 21 throughout the second period. The present invention should not be limited to such a structure. The power supply ECU 13 may continuously supply power to the magnetic sensor 21 only in a period during which the brake operation is being detected. The switch device 4 modified to have this structure has drastically reduced dark current, compared with when having the structure for continuously supplying power to the magnetic sensor 21 throughout the second period.

In the preferred embodiment, the power supply ECU 13 intermittently supplies power to the magnetic sensor 21 in the first period. The present invention should not be limited to such a structure. The power supply ECU 13 may continuously supply power to the magnetic sensor 21 in the first period as in the second period. The switch device 4 modified to have this structure provides satisfactory responsiveness to the pressing of the push button P in the first period.

The power supply ECU 13 may continuously supply power to the magnetic sensor 21 after the second period elapses.

In the preferred embodiment, the power supply ECU 13 continuously supplies power to the magnetic sensor 21 in the second period. The present invention should not be limited to such a structure. The power supply ECU 13 may intermittently supply power to the magnetic sensor 21 in the second period as in the first period. The switch device 4 modified to have this structure has reduced dark current in the second period.

The predetermined time of the second period is not limited to one minute, but may be appropriately changed. However, the time of the second period is preferably 40 to 80 seconds, and more preferably 50 to 70 seconds.

The proportion of the ON period and the OFF period in one cycle may be changed when the power supply ECU 13 intermittently supplies power to the magnetic sensor 21.

An optical sensor may be used as the detection unit instead of the magnetic sensor 21. It is only required that the detection unit be a non-contact type sensor.

The brake sensor 22 may be of either non-contact type or contact type.

The present examples and embodiments are to be considered as illustrative and not restrictive, and the invention is not to be limited to the details given herein, but may be modified within the scope and equivalence of the appended claims.

What is claimed is:

1. A switch device for starting an engine of a vehicle by a driver, wherein the vehicle has an ID code, and the switch device is communicable with a portable device that transmits a signal including an ID code, the switch device comprising:
   an operated member operable by the driver for starting the engine;
   a detection unit supplied with power for detecting, in a non-contact manner, that the operated member has been operated; and
   a power supply control unit, connected to the detection unit, for controlling power to the detection unit to enable the detection unit to detect that the operated member has been operated; and
   a comparison unit for receiving the signal including the ID code from the portable device, comparing the ID code of the portable device with the ID code of the vehicle, and permitting the engine to start when the two ID codes match, wherein the power supply control unit does not supply power to the detection unit when the comparison unit does not permit the engine to start.

2. The switch device according to claim 1, wherein:
   the operated member includes a magnet; and
   the detection unit includes a magnetic sensor arranged in a vicinity of the operated member, for detecting that the magnet has approached the detection unit to detect that the operated member has been operated.

3. The switch device according to claim 1, wherein the power supply control unit intermittently supplies power to the detection unit after the comparison unit permits the engine to start.

4. The switch device according to claim 1, wherein the vehicle includes a brake, the switch device further comprising:
   a brake sensor, connected to the power supply control unit, for detecting a brake operation performed by the driver, wherein the power supply control unit intermittently supplies power to the detection unit in a period from when the comparison unit permits the engine to start to when the brake sensor detects the brake operation.

5. The switch device according to claim 4, wherein the power supply control unit intermittently supplies power to the detection unit by cyclically repeating a first period during which power is being supplied to the detection unit and a second period during which power is not being supplied to the detection unit.

6. The switch device according to claim 5, wherein the first period is shorter than the second period.

7. The switch device according to claim 6, wherein the first period is 10 msec and the second period is 90 msec.

8. The switch device according to claim 4, wherein the power supply control unit continuously supplies power to the detection unit when the brake sensor detects the brake operation while the comparison unit is permitting the engine to start.

9. The switch device according to claim 8, wherein the power supply control unit continuously supplies power to the detection unit for a period during which the brake sensor is detecting the brake operation while the comparison unit is permitting the engine to start.

10. The switch device according to claim 8, wherein the power supply control unit continuously supplies power to the detection unit in a period during which a predetermined time elapses from when the brake sensor detects the brake operation while the comparison unit is permitting the engine to start.

11. The switch device according to claim 10, wherein the predetermined time is approximately one minute.

12. A switch device for starting an engine of a vehicle by a driver using a portable device that transmits a signal including an ID code, wherein the vehicle has an ID code and a brake, the switch device comprising:
   a comparison unit for receiving the signal including the ID code from the portable device, comparing the ID code of the portable device with the ID code of the vehicle, generating a permission signal when the two ID codes match, and outputting the permission signal;
   an operated member operable by the driver for starting the engine;
   a detection unit supplied with power for detecting, in a non-contact manner, that the operated member has been operated;
   a brake sensor for detecting a brake operation performed by the driver; and
   a power supply control unit, connected to the comparison unit, the detection unit, and the brake sensor, for receiving the permission signal from the comparison unit and controlling power to the detection unit, wherein the power supply control unit supplies power to the detection unit in response to the permission signal and continuously supplies power to the detection unit either in a period during which the brake sensor is detecting the brake operation or in a period until a predetermined time elapses from when the brake sensor detects the brake operation.

13. The switch device according to claim 12, wherein the operated member is a push button including a magnet, and the detection unit includes a magnetic sensor arranged in a vicinity of the push button, for detecting approach of the magnet when the push button is pressed.

14. The switch device according to claim 12, wherein the power supply control unit continuously supplies power to the detection unit in a period of approximately until one minute has elapsed from when the brake sensor detects the brake operation.

15. The switch device according to claim 12, wherein the power supply control unit intermittently supplies power to the detection unit in a period from when the power supply control unit receives the permission signal to when the brake sensor detects the brake operation.

16. The switch device according to claim 15, wherein the power supply control unit intermittently supplies power to the detection unit by cyclically repeating a first period during which power is being supplied to the detection unit and a second period during which power is not being supplied to the detection unit.

17. The switch device according to claim 16, wherein the first period is shorter than the second period.

18. The switch device according to claim 17, wherein the first period is 10 msec and the second period is 90 msec.

* * * * *